(12) United States Patent
Heikel et al.

(10) Patent No.: US 9,626,016 B2
(45) Date of Patent: Apr. 18, 2017

(54) SYSTEM AND METHOD FOR INTERACTIVE DISTRIBUTION OF DIGITAL CONTENT

(71) Applicant: Posterfy Oy, Helsinki (FI)

(72) Inventors: Jussi Oskari Heikel, Helsinki (FI); Tuomas Ilmari Kannas, Helsinki (FI); Tomi Juha Mattila, Espoo (FI); Olli-Heikki Paloheimo, Espoo (FI); Kari Tapani Hjelt, Espoo (FI); Riku Rikkola, Tampere (FI)

(73) Assignee: Posterfy Oy, Helsinki (FI)

( * ) Notice: Subject to any disclaimer, the term of this patent is extended or adjusted under 35 U.S.C. 154(b) by 20 days.

(21) Appl. No.: 14/269,379

(22) Filed: May 5, 2014

(65) Prior Publication Data

US 2015/0062073 A1     Mar. 5, 2015

(51) Int. Cl.
| | |
|---|---|
| *G06F 3/041* | (2006.01) |
| *G06F 3/044* | (2006.01) |
| *G06F 3/046* | (2006.01) |
| *G06F 1/16* | (2006.01) |
| *G06Q 30/02* | (2012.01) |

(52) U.S. Cl.
CPC ............ *G06F 3/041* (2013.01); *G06F 1/1626* (2013.01); *G06F 3/044* (2013.01); *G06F 3/046* (2013.01); *G06Q 30/0267* (2013.01); *G06F 2203/04108* (2013.01)

(58) Field of Classification Search
CPC .......... G06F 3/041; G06F 3/044; G06F 3/046; G06F 2203/04108; G06F 1/1626; G06Q 30/0267

USPC ......................................................... 345/173
See application file for complete search history.

(56) References Cited

U.S. PATENT DOCUMENTS

| | | |
|---|---|---|
| 8,255,836 B1 | 8/2012 | Gildfind |
| 2008/0198098 A1 | 8/2008 | Gelbman et al. |
| 2011/0296351 A1 | 12/2011 | Ewing, Jr. |
| 2012/0022953 A1 | 1/2012 | Cheng |
| 2012/0110516 A1 | 5/2012 | Tumanov |
| 2012/0314275 A1 | 12/2012 | Hung |
| 2012/0317511 A1 | 12/2012 | Bell |

FOREIGN PATENT DOCUMENTS

CN    102830800 A    12/2012

*Primary Examiner* — Gustavo Polo
(74) *Attorney, Agent, or Firm* — Ziegler IP Law Group, LLC

(57) ABSTRACT

A system for distribution of digital content includes at least one interactive terminal with a display, at least one battery, electronics for enabling digital image creation on the display, a communication module, and means for controlling an interactive touchless user interface in order to display selected content on the interactive terminal. In addition, a method for digital distribution of digital content with content pages c=1, 2, . . . , h to be displayed with at least one interactive terminal at at least one location j=1, 2, . . . , m, includes locating at least one i=1, 2, . . . , n interactive terminals at a defined location j=1, 2, . . . , m for displaying the digital content, providing means for interaction with a user via the touchless user interface, based on user input, and communicating with a server infrastructure to display selected content on the interactive terminal.

21 Claims, 11 Drawing Sheets

SYSTEM AND METHOD FOR INTERACTIVE DISTRIBUTION OF DIGITAL CONTENT

TECHNICAL FIELD

The present disclosure relates to a system and method for interactive distribution of digital content. The disclosed embodiments are suitable for on-site advertising, i.e. for commercial applications. The disclosed embodiments are also suitable for use in hygienic sensitive locations. The disclosed embodiments further relate to a method for digital distribution of digital display content to be displayed at $j=1, 2, \ldots, m$ defined locations.

BACKGROUND

US 2012/0314275 A1 discloses an electrophoresis display apparatus, which is suitable for electronic billboards, smart cards, electronic identifiers and other information transmission media that are used for displaying specific images. The electrophoresis display apparatus includes an electronic-ink layer, a passive-matrix substrate and a conducting layer. The passive-matrix substrate has an electrode surface and the electrode surface has a plurality of electrodes. The conducting layer has a predetermined shape. The conducting layer is disposed between the electronic-ink layer and the electrode surface of the passive-matrix substrate.

US 2012/0022953 A1 describes a method for displaying an advertisement on an electronic apparatus. When the electronic apparatus is ready to enter a specific status, an electronic ink display of the electronic apparatus displays an advertisement. The specific status can be a turn-off mode or a power-saving mode. When the electronic apparatus enters the specific status, a power supply of the electronic ink display is terminated. Therefore, the advertisement is still displayed on the electronic ink display even if the power supply of the electronic ink display terminated.

US 2008/0198098 A1 teaches an electronic sign employing a bi-stable, non-volatile display material activatable by electrodes to convey information. A sensor detects when the electronic sign is inserted in or in the vicinity of an insertion area, and controls the operation of the sign based on the detected location. A backplane in the electronic sign includes different patterns of addressable elements to provide a display that may be pixel, font region, or icon addressable or may have a combination of one or more of the pixel, font region, or icon addressability. A remote device communicates with the electronic sign, and multiple electronic signs may communicate with each other via a communication protocol. An electronic display can display one or more graphical or textual representations simultaneously or sequentially. An electronic sign or label can be used in conjunction with an RFID tag. Further machine readable data can be displayed on an electronic display. A visual indicator can be presented on an electronic display associated with an electronic sign or label in a machine readable format wherein the visual indicator is a matrix array symbology. The matrix array can be made up of hexagonal, square, polygonal and/or other geometric shapes, lines or dots. A visual indicator can be presented on an electronic display associated with an electronic sign or label in a machine readable format such as a barcode.

U.S. Pat. No. 8,255,836 B1 discloses a computing device that may be configured to receive user input for initiating a hover mode of interaction. The computer device may include one or more processors, a storage device, memory, and a network interface. The computing device may also include a user interface having a touch-sensitive screen and gesture detection module. The computing device may further include a microphone and speaker, a battery that provides power to the components of the computing device and other user interface components such as a keypad, trackball, mouse, or other such user interfaces that allow the user to interact with computing device.

US 2012/0317511 A1 describes a system comprising a display with a built-in 3D vision system configured to provide vision data and a computer. Various processors, memory, user and network interfaces may be included to allow for exchanges of information and execution of various software modules, engines, and applications. The vision software may include perspective transforms, person segmentation, body tracking, hand tracking, gesture recognition, touch detection and face tracking.

US 2011/0296351 A1 discloses a device having a user interface. The device may be a telecommunication device, touch screen device, tablet computing device or other portable computing device. The user interface may be presented on a display or screen of the device. The user interface includes a plurality of items arranged in a column or stack which may be representations of applications present on the device. The stack presents the items so that the items appear to be stacked in the direction of the z-axis of an coordinate system of the user interface. A user is able to interact with the items to cause the items to move forward or backward along the z-axis so that each of the items may be viewed by the user. The user can scroll through the stack and view a large number of items.

US 2012/0110516 A1 teaches a gesture based user interface provided for a user to interact with a device in order to operate and control the device through detection of gestures and movements of the user. Visual feedback of the user gesture is provided to the user. An image capturing device may be employed to capture a user's image, and an integrated application on a computing device may process continuous images from the capturing device to recognize and track user gestures. The gestures may correlate to an object and/or location on the display. A position aware gesture recognition and visual feedback system may be implemented via software executed over one or more servers. The platform may communicate with client applications on individual computing devices such as a smart phone, a laptop computer or desktop computer through a network. An application executed on one of the servers may facilitate the detection and tracking of user gestures and the processing of images from a capturing device to perform gesture tracking and location analysis. The application may provide visual feedback to a user by correlating a user's gesture to a location on a display where the user interaction takes place.

CN 102830800 A discloses a method and a system for controlling a digital signage by utilizing gesture recognition. The page turning operation of the digital signage is completed by the waving of a user. The method comprises the steps of continuously acquiring user images, processing the acquired each frame of use image to obtain a hand binary image and a corresponding external rectangular image, judging the length-width ratio of the current each frame of external rectangular image to determine that a user needs to wear a long sleeve blouse or a short sleeve blouse, and judging the horizontal movement distance and the horizontal movement distance of the current frame of external rectangular image relative to the central point of the previous frame of the external rectangular image, comparing the distance from the center of gravity of the current frame of the hand binary image to the left border and the right border of the external rectangular image, and combining the condition that the user wears the long sleeve blouse or the short sleeve blouse to determine whether the user waves towards the right or the left and triggers the corresponding page turning operation.

CN 102830800 A discloses a method and a system for controlling a digital signage by utilizing gesture recognition. According to the method and the system, the mouse click operation is realized by the recognition of the user gesture. The method comprises the steps of displaying the information needing to be clicked on the above position of a screen, continuously acquiring a user image, processing the acquired each frame of user image to obtain a hand binary image and a corresponding external rectangular image, selecting a pixel point of any one fixed point of the external rectangular image as a palm point, and mapping the position of the palm point on the user image to be as the position at which a mouse of a system is positioned, and when the mouse is moved to the position on which the information can be clicked, and conducting click operation after the scheduled time is stopped.

SUMMARY

Existing examples of on-site advertisement systems are printed posters and digital flat panel displays placed in point of purchase locations such as shops or restaurants or public places such as stations, bus stops or streets.

Posters or billboards based on printed graphics are still in very active use due to their low cost and simplicity. However, the effectiveness of printed graphics is limited, especially in urban environments where the billboard installation density is overwhelming, the advertisements may easily remain un-noticed or are simply ignored.

Digital signage based on flat panel displays, liquid crystal displays (LCD) being the currently dominating technology, is further rapidly expanding in on-site advertising. The advantages over printed graphics include the possibility to dynamically change the displayed content, i.e. the electronic display can display one or more graphical or textual representations simultaneously or sequentially or display animated content or video content, and the possibility for remote content update, so that replacement of printed graphics can be avoided. To allow interactivity, the flat panel displays can be further equipped with suitable means such as touch screen functionality—an approach commonly applied, for example, in guidance or self-service terminals.

Furthermore, mobile marketing, in particular, the context-location-specific advertising in consumer mobile terminals, is an emerging trend that combines the on-line and the on-site approaches. However, a mobile terminal residing in the pocket of an in-store consumer is simply not an effective advertising channel. Consumers tend to be reluctant to receive advertisements in their personal mobile devices—in particular, if the advertisements are automatically pushed to the terminal rather than result from user actions.

The demanding installation of flat panel displays forms a key bottle-neck in their usage. First, the pure physical mass and the fragility of LCDs, combined with their substantial cost, require sturdy mechanical structures to guarantee safety and durability in public areas, e.g. against vandalism and theft. Second, due to the large power consumption, the power cord is in practice mandatory for the LCD displays. However, the power cord induces multiple challenges for the installation such as aesthetic aspects, and safety and durability aspects, e.g. meeting electrical safety standards, tolerating tear and wear and resistance towards vandalism. As a consequence, the installation requires careful planning and the installation cost becomes a substantial limitation. Furthermore, the installation location is essentially permanent and prevents flexible dynamic relocation of the displays.

Interactive touch screens require a physical contact with the user and are thus non-hygienic and prone to accumulating fingerprints, dirt and bacteria from users. Many users therefore hesitate to use the public interactive screens. On the other hand, frequent cleaning is necessary to keep the public touch screens in usable condition, which induces substantial added cost. Similar problems obviously plague the traditional mechanical push-buttons or keypads in public installations. Also, the conventional solutions are difficult to make tolerant to vandalism, for example, a touch screen is difficult to place behind a thick protective shield made of glass or plastic without compromising the performance.

In hygienic sensitive environments, such as operating rooms in hospitals, user interface devices such as displays with touch screen functionalities or common keyboards, which require a physical contact with the user's hands, also have to be frequently cleaned, disinfected or sterilized.

The presently disclosed embodiments provide a system for distribution of digital content having at least one interactive terminal such as an information terminal, an on-site advertisement terminal or a medical terminal with an electronic digital display. The system may allow interface operation without any physical contact with a user during interface operation. The disclosed embodiments are useful in hygienic sensitive locations such as in public areas, hospitals or restrooms. The disclosed embodiments also provide a method for digital distribution of digital display content to be displayed at $j=1, 2, \ldots, m$ defined locations.

Thus the disclosed embodiments are directed to an interactive terminal such as an information terminal, an on-site advertisement terminal or a medical terminal with an electronic digital display comprising:
  at least one rechargeable and/or replaceable battery,
  a main electronics board including at least one microcontroller or microprocessor,
  the main electronics board including at least one non-volatile memory for storing digital display content such as advertising material, patient data or a checklist,
  the main electronics board including display electronics for enabling the digital image creation on the electronic digital display by the at least one microcontroller or microprocessor,
  the main electronics board including a wireless and/or cellular communication module and antennas for wireless and/or cellular communication, and
  the main electronics board including touchless user interface electronics.

The electronic digital display may be an electrophoretic active matrix panel, or any other bi-stable or multi-stable display such as a cholesteric liquid crystal display.

A touchless user interface based on the detection of electromagnetic waves may be included. The electromagnetic waves can be, but are not limited to, visible or near-infrared or infrared or radio-frequency waves. The approach can be active, i.e. transceiving, or passive, i.e. receiving. A reflectance IR touchless user interface may be included where light is to be emitted by means of one or more IR LEDs, emitted light is to be reflected by means of a user's hand, and reflected light is to be measured using at least one IR sensor. The interactive terminal may also include a capacitive touchless user interface or a rf-radar touchless user interface.

The interactive terminal may comprise means adapted to interact with another device, system or apparatus.

The interactive terminal may comprise at least one LED indicator board arranged beside the electronic digital display of the interactive terminal which emits visible light signals such as programmed blinking and flashing patterns or moving string of pearls patterns visible from outside of the interactive terminal.

The interactive terminal may comprise audio electronics with an output transducer such as a speaker and/or an input transducer such as a microphone in an audio module.

The interactive terminal may also comprise at least one photovoltaic cell for power harvesting.

The interactive terminal may further comprise a protective front layer such as plexiglass.

The interactive terminal may still further comprise at least one layer of printed graphics with an opening for the electronic digital display and/or openings for the IR-based touchless user interface. The interactive terminal may comprise at least one layer of printed graphics arranged beside the electronic digital display. The at least one layer of printed graphics may be replaceable. At least one LED of the at least one LED indicator board may be visible either through the at least one layer of printed graphics or through at least one transparent opening of the at least one layer of printed graphics.

The interactive terminal may comprise mechanical means for attaching the interactive terminal to another device, system or apparatus or to a wall.

The disclosed embodiments are also directed to:
A system for distribution of digital content having at least one interactive terminal with a display comprising:
  at least one battery,
  an electronics board including at least one microprocessor, at least one memory for storing digital content, and electronics for enabling the digital image creation on the display by the at least one microprocessor, wherein the system further includes:
  a wireless and/or cellular communication module
  at least one antenna for wireless and/or cellular communication with at least one server infrastructure, and
  means for controlling a touchless user interface in order to provide interactive user input to said system in order to display selected content on said interactive terminal.

The disclosed embodiments are further directed to a method for digital distribution of digital display content with content pages c=1, 2, . . . , h such as advertising material to be displayed at j=1, 2, . . . , m defined locations, wherein
  i=1, 2, . . . , n interactive terminals with unambiguous identity are located at j=1, 2, . . . , m defined locations, each of the i=1, 2, . . . , n interactive terminals comprising an electronic digital display, at least one rechargeable and/or replaceable battery, a main electronics board including at least one microcontroller or microprocessor, the main electronics board including at least one non-volatile memory for storing digital display content with content pages c=1, 2, . . . , h such as advertising material, the main electronics board including display electronics (104) for enabling the digital image creation on the electronic digital display by the at least one microcontroller or microprocessor, the main electronics board including a wireless and cellular communication module and antennas for wireless and cellular communication,
  including a wireless and/or cellular communications network,
  including at least one server infrastructure with control software for uploading and/or downloading digital display content with content pages c=1, 2, . . . , h such as advertising material or usage data to and/or from each of the i=1, 2, . . . , n interactive terminals,
  the at least one server infrastructure and each of the i=1, 2, . . . , n interactive terminals are adapted to interact via the wireless and/or cellular communications network, and
  digital display content with content pages c=1, 2, . . . , h such as advertising material or usage data is uploaded from the at least one server infrastructure to at least one of the i=1, 2, . . . , n interactive terminals and/or downloaded from at least one of the i=1, 2, . . . , n interactive terminals to the at least one server infrastructure.

The main electronics board of at least one of the i=1, 2, . . . , n interactive terminals with unambiguous identity may include touchless userface electronics.

At least one of the i=1, 2, . . . , n interactive terminals may display a first page of the content pages c=1, 2, . . . , h, then a touchless swipe of user's hand is detected by the at least one of the i=1, 2, . . . , n interactive terminals, and the at least one of the i=1, 2, . . . , n interactive terminals displays a second page of the content pages c=1, 2, . . . , h after detection of the touchless swipe of user's hand.

At least one of the i=1, 2, . . . , n interactive terminals may be attached or connected to another system, apparatus or device,
  the at least one of the i=1, 2, . . . , n interactive terminals may be attached or connected to the other device, apparatus or system and may be adapted to interact with the other system, apparatus or device,
  the at least one of the i=1, 2, . . . , n interactive terminals attached or connected to the other device, apparatus or system displays a first page of the content pages c=1, 2, . . . , h,
  the at least one of the i=1, 2, . . . , n interactive terminals attached or connected to the other device, apparatus or system comprises means for detection of an external trigger,
  the external trigger is detected by the at least one of the i=1, 2, . . . , n interactive terminals attached or connected to the other device, apparatus or system, and
  the at least one of the i=1, 2, . . . , n interactive terminals attached or connected to the other device, apparatus or system displays a second page of the content pages c=1, 2, . . . , h after detection of the external trigger.

The external trigger may comprise: putting a coin into the other device, system or apparatus, selecting a product such as chewing gums or a chocolate bar in the other device, system or apparatus, operating a towel dispenser, flushing the toilet in a restroom or using the water-tap in a restroom.

The disclosed embodiments are further directed to:
A method for digital distribution of digital content with content pages c=1, 2, . . . , h to be displayed with at least one interactive terminal at at least one location j=1, 2, . . . , m, wherein the method includes the steps of:
  locating at least one i=1, 2, . . . , n interactive terminal at a defined location j=1, 2, . . . , m for displaying said digital content;
  providing means for interaction with a user via a touchless user interface to receive a user input;
  based on said user input, communicating over a wireless and/or cellular communications network and at least one server infrastructure adapted to interact with said wireless and/or cellular communications network, in order to display selected content on said at least one interactive terminal.

Considerable advantages are obtained by means of the embodiments disclosed herein. The interactive terminal offers the possibility of easy and flexible cordless installation, not achievable by state of the art flat panel display solutions such as LCD displays. The interactive terminal can make mechanical structures available to guarantee safety and durability in public areas, e.g. against vandalism and theft. The possibility of a slim physical shape allows a convenient installation into a poster-like frame or stand. The light weight of the interactive terminal furthermore also assists in installation and transport. The interactive terminal may be attachable to a wall or any other device, e.g. a coffee machine, a chewing gum machine or a towel dispenser, and may be adapted to interact with the other device.

The interactive terminal can be used without any physical contact to the user hand during interface operation and is thus hygienic and insusceptible to accumulating fingerprints, dirt or bacteria from users. Therefore, the interactive terminal may be useful in hygienic sensitive locations, e.g. in public, hospitals or restrooms. The electronic digital display can display any content, for example one or more graphical and/or textual representations displayed simultaneously or sequentially. The digital display content may be an advertisement viewable in public, e.g. in a public restroom. The touchless user interface may be usable in sterile environments such as operations rooms of hospitals. The digital display content may also, for example, be a checklist of a surgeon or dentist that may include one or more content pages. Compared to systems with touch-screen displays or common mouse and keyboard devices, frequent cleaning, disinfection or sterilization of the hygienic interactive terminal is not necessary to keep the device in usable condition.

Smart functionalities such as dynamic displayed content, interactivity, remote content update, LED indicators for increased attraction and/or optional audio content can make the solution drastically more effective than pure printed graphics. Interactivity with users' mobile devices such as smart phones is also possible. The disclosed embodiments comprise the capability to issue digital codes that the user can capture. Such codes may include, for example, 2D-barcodes such as QR-codes, which can be utilized using a smart phone. Similarly, purely electronic digital codes can be issued to the user mobile device via a cellular or other wireless communication module.

The disclosed embodiments are capable of providing a detailed measurement of the advertising effectiveness, e.g. usage statistics or collection of user feedback, and for an invoicing model based on measured usage.

Another aspect of the embodiments disclosed herein is the very low power consumption of the interactive terminal. The display technology plays a key role in achieving the low power. By using the conventional back-lit LCD displays, the cordless operation times are very restricted as well-known from the existing tablet computers despite being packed with a large-capacity battery, e.g. >20 [Wh]. Instead, low-power display technologies, such as an electronic paper display dramatically reduce the power consumption as the display needs power only when updated. Following a similar strategy for the entire terminal electronics, as a default, the terminal may reside in a sleep mode where all the electronic components are in their respective low-power passive states and they awaken into their active state only when needed. For example, the microcontroller may only be periodically brought up to conduct a visual attraction sequence via the blinking indicator LEDs, accompanied optionally by an audio signal. Similarly, the touchless user interface may spend its time in a low-power presence detection mode as a default, and may awaken into the active browsing mode only when necessary.

The reduced energy consumption further leads to reduced $CO_2$-emissions which is obviously beneficial from the sustainability viewpoint.

Optionally, the interactive terminal includes means for wireless charging which assist in environment-proof sealing of the device in the absence of connectors.

BRIEF DESCRIPTION OF THE DRAWINGS

For a more complete understanding of the disclosed embodiments and their advantages, reference is now made to the following descriptions, taken in conjunction with the accompanying drawings. In the drawings.

DETAILED DESCRIPTION

Figure 1A:
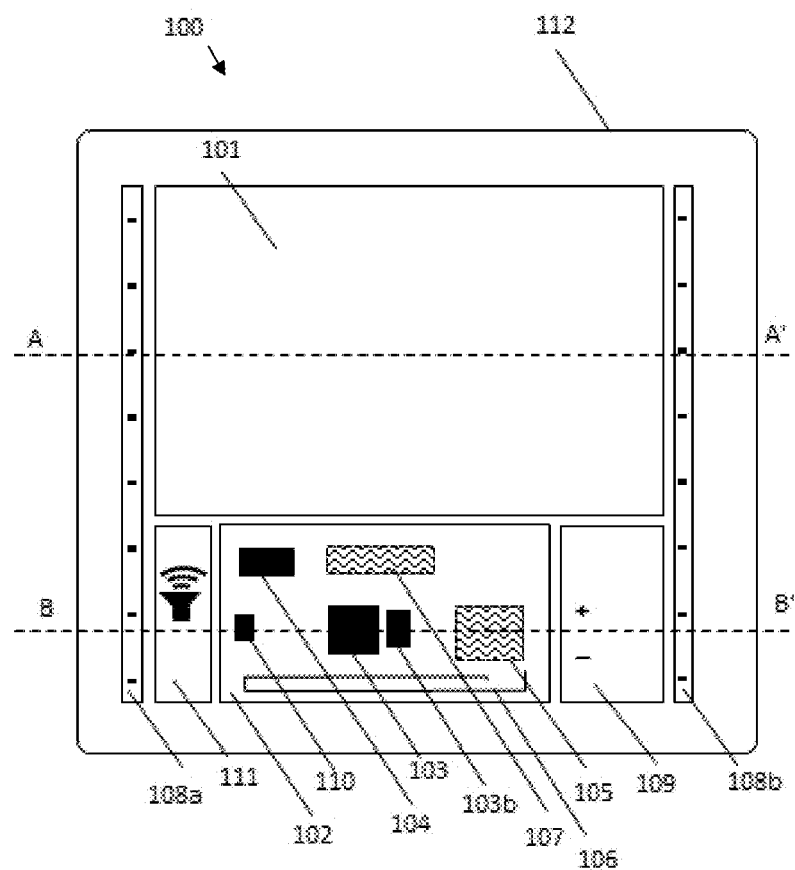
FIG. 1a illustrates a schematic top view of an interactive terminal according to the disclosed embodiments.

FIG. 1a shows a schematic top view of an interactive terminal according to the disclosed embodiments. The terminal 100 includes an electronic digital display 101 that is used to show advertising and/or other desired material. The display may be an electrophoretic active matrix panel, i.e. an electronic paper display. A central aspect of the electronic paper display is the low power consumption. Power is essentially only consumed when the display content is changed. The low-power consumption of the display is a central factor in enabling the battery-powered cordless operation of the terminal with long battery charging or battery replacement interval. In addition to electrophoretic display technology, any other bi- or multi-stable display technology may be used such as cholesteric liquid crystal displays. In some applications, segmented displays may be utilized. The advantages of segmented displays include power savings and easier manufacturing of flexible displays in comparison with the active-matrix variants.

The terminal further includes the main electronics board 102 whose main components are the microcontroller or microprocessor 103a, the non-volatile memory 103b, the display electronics 104, the wireless and cellular communication module 105, the antennas for wireless and cellular communication 106, and the touchless user interface electronics 107. The terminal is powered by at least one rechargeable and/or replaceable battery 109.

The system further may include the LED indicator boards 108a, 108b. The LED boards emit visible light and are used to output visual signals to attract users or to provide feedback in the interactive usage. The emitted signals may include, for example, various programmed blinking and flashing patterns, such as moving string-of-pearls-type patterns. Point-wise discrete LED elements may be used to achieve a maximized visual impact at a low power consumption.

The main board functions may be divided into modules. In addition modules such as the display 101, the LED indicator boards 108a, 108b, and the touchless user interface 107 may be incorporated as modules separate from the main electronics board 102 providing advantages such as more flexible placement vs. the other components in the terminal 100. Similarly, the modular incorporation can be beneficial to be utilized for the wireless and cellular communication module 105 or for the antennas 106 or any other component on the main board 102.

The at least one microcontroller or microprocessor 103a takes care of the logic functionality in the device. The non-volatile memory 103b is used to store digital display content with content pages c=1, 2, . . . , h such as advertising material or usage data. The display electronics 104 includes the required functionalities to enable the digital image creation on the display 101 by the at least one microcontroller or microprocessor 103a.

The touchless user interface 107 can be realized by several techniques based on detection of the electromagnetic waves. The interface may be based on the active, i.e. transceiving, or passive, i.e. receiving, approaches. An example of the passive approaches are the Passive Infrared Radiation (PIR) sensors which can detect the IR radiation by the users body or body part. In the active approaches the selected electromagnetic wavelength is emitted and the back-scattered signal is measured. The used wavelengths include, but are not limited to, the visible, near-infrared or infrared wavelengths or the longer radio wavelengths. In at least one embodiment, the touchless interface 107 may be based on reflectance IR approach where the light, emitted from one or more IR LEDs and reflected by user's hand, is measured using an IR sensor. The advantages of such an IR reflectance approach include low power consumption via short IR pulses, insensitivity to user wearing gloves and functionality through thick protective fronts such as plexi-glass.

According to at least one embodiment, using a configuration of two IR LEDs and one detector placed in a horizontal row, i.e. a sensor placed between the LEDs, it is possible to create a reliable system to sense left and right swipe gestures by the user hand. Such a simple user interface is well suited for terminal content browsing, i.e. slide change, or answering yes or no type questions.

More sophisticated gestures can also be conveniently implemented. For example, using the same two-LED one sensor configuration, the horizontal position of the hand regarding the sensor can be determined, as well as the vertical distance from the sensor, which can be used to implement multi-choice menus. Adding a third IR LED, the hand position can laterally be sensed in two directions, i.e. x- and y-direction, increasing the browsing possibilities.

Figure 1B:
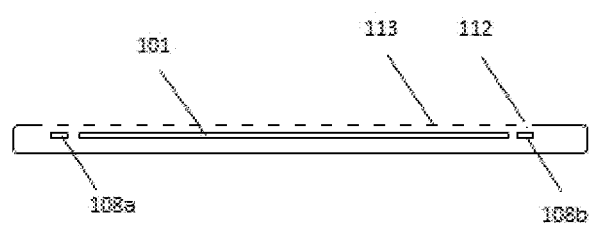
FIG. 1b illustrates a schematic view of a cross-sectional area of the interactive terminal at intersection A-A" according to FIG. 1a, FIG. 1c illustrates a schematic view of a cross-sectional area of the interactive terminal at intersection B-B" according to FIG. 1a, FIG. 2 illustrates a schematic view of bi-directional external communication.
Figure 1C:
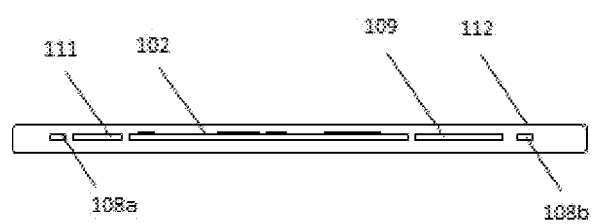

The electronic components of the interactive terminal are enclosed in a housing 112, only schematically illustrated in FIG. 1a. In front of the display 101, the housing has an opening or transparent window 113, schematically illustrated in FIG. 1b.

Optionally, the interactive terminal 100 further may include the functionality to emit and record audio signals and messages. This may be realized using the audio electronics 110 and an output transducer such as a speaker in the audio module 111. The device may further have the audio input capability, employing an input transducer, i.e. a microphone, in the audio module 111 and the related audio electronics 110. The audio output signals may include advertisement materials, guidance messages or acknowledgement tones. The audio input signals may include monitoring the ambient audio environment for adjusting the device parameters such as the audio output level and the audio messages left by the user.

As illustrated in FIG. 1a, in at least one embodiment, an optimally thin terminal may be achieved, when the electronic parts are arranged laterally in such a way that the vertical stacking of the components is minimized. In at least one embodiment, the main electronics board 102, the battery 109, the LED panels 108a, 108b and the optional audio parts 111 are not placed underneath the display 101. This is in contrast with conventional hand-held consumer terminals, such as e-book readers or tablet computers, where lateral size may be optimized and vertical component stacking may be utilized. In the present interactive terminal 100, the lateral size is less restrictive, for example, since the electronic display 101 can be surrounded by a significant area of printed graphics 121. Instead, the minimized vertical thickness is advantageous to allow a slimline electronics module which can be easily housed in conventional poster frame configuration.

Figure 2:
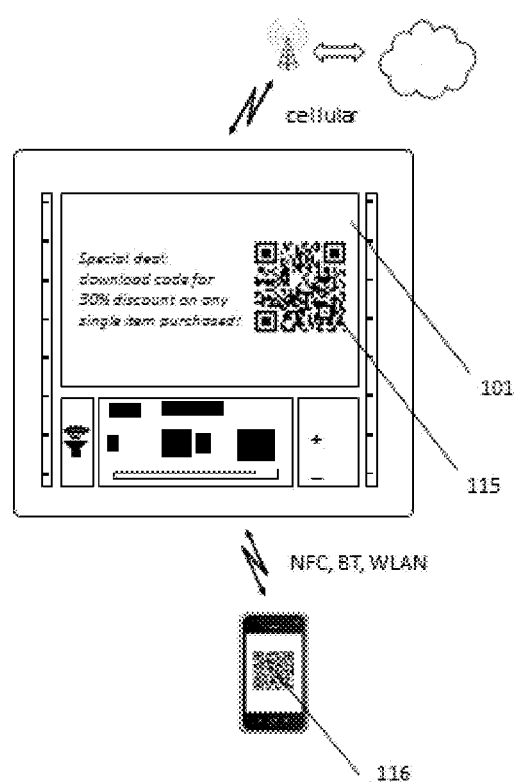

The wireless and cellular module 105 and the related antennas 106 are used for external communication as illustrated in FIG. 2. The cellular communication functionality has the advantage that it makes the interactive terminal 100 independent of the local wireless infrastructure such as the existence of suitable local WLAN networks. The cellular connection may be used to enable the bi-directional information exchange between the interactive terminal 100 and the remote cloud services. The wireless functionalities of the terminal may include local communication standards such as Wireless Local Area Network (WLAN), Bluetooth (BT) and Near-Field Communication (NFC). These wireless channels may allow an information exchange between the interactive terminal and a user's mobile device 116, such as a smart phone, and the service-oriented uploading and downloading of information with the terminal such as content updates or firmware updates.

Another local digital communication channel with the consumer's mobile devices 116, e.g. smart phones or tablet computers, may be formed by graphical codes 115, such as 2D bar codes, that can be shown on the electronic display 101 as illustrated in FIG. 2. Such codes can be conveniently captured using the user's mobile device 116 and utilized, for example, to provide digital coupons or digital information such as product information or links to a web site. According to the disclosed embodiments, the electronic display 101 can be used to show unique, personalized codes. For example, the discount code can be specific to the interactive terminal 100 and the instant of capture. Optionally, the code can further be interlinked to the loyal customer information stored on the mobile device 116 of the user. When the unique discount code is next used at a retail location, its origin can be traced to the interactive terminal 100 from which it was captured. This forms a very powerful way to monitor the interactive terminal network effectiveness and the consumer behavior, for example, where codes get downloaded most and where they are spent.

In addition to graphical codes captured by the mobile device 116, e.g. the smart phone camera, the advertising interactive terminal 100 can use the local wireless communication channels, for example BT and NFC, to issue digital codes to the mobile device 116 of the user. A specific advantage of codes downloaded via such wireless links is that the interactive terminal 100 has the specific knowledge that a code has been downloaded, while with graphical codes their capture is more challenging to confirm. Furthermore, the wireless communication channels can be used for bi-directional information exchange between the interactive terminal 100 and the mobile device 116 of the user. This allows advantageous functionalities such as displaying customized advertisement content on the interactive terminal 100 based on user preferences or local downloading of product information without the need for an internet connection by the mobile device 116 of the user.

FIGS. 3a and 3b and FIGS. 4a and 4b illustrate additional embodiments. The interactive terminal 120 includes a layer of printed graphics 121 that accompanies the electronic display 101. The printed layer has a transparent opening for the electronic display and openings 125 for the IR-based touchless user interface. The LED indicators 108a and 108b are visible either through the printed layer or the printed layer has transparent openings for the LEDs. The terminal may have a protective front layer 122 such as plexiglass. The printed layer 121, e.g. paper or plastic sheet, is sandwiched between the front layer 122 and the lower parts of the terminal. The printed layer can be a separate layer which is easily replaced. Alternatively, the printed layer can be directly laminated to the underside of the protective front layer 122. The electronic parts can be directly housed by the terminal frame 123 which consequently can be considered as a "smart poster frame" with a replaceable layer of printed graphics 121. Alternatively, various mechanical means 124, illustrated schematically in FIG. 4a, can be used to build a slim, stand-alone electronics module which can be utilized in existing poster frames. The interactive terminal 120 may also comprise mechanical means 124 for attaching the interactive terminal 100 to another device, system or apparatus or to a wall. The other apparatus may be for example a towel dispenser with a small permanent magnet attached to one of the rotating gears that control the towel web movement in the dispenser. The interactive terminal 100 may comprise a magnetic sensor, e.g. a Hall-sensor, for detection of the motion of the rotating gear. Detection of motion may then lead for example to actuation of the digital electronic display 101, to displaying of another page of the content pages or to displaying of towel consumption information. The interactive terminal may comprise a further magnetic sensor, e.g. a Hall-sensor. The interactive terminal 100 may be adapted to interact with a chipcard or a magnetic card. The card may be for example used to acknowledge cleaning of a room. Cleaning information such as the name of the cleaner, cleaning intervals or last-cleaned information may be displayed on the digital electronic display 101. The interactive terminal 100 may also act as a local gateway hub such as a washroom hub for other devices such as soap dispensers, air refreshener or other equipment in the washroom which communicate to the interactive terminal 100, e.g. using Bluetooth LEE.

Figure 3A:
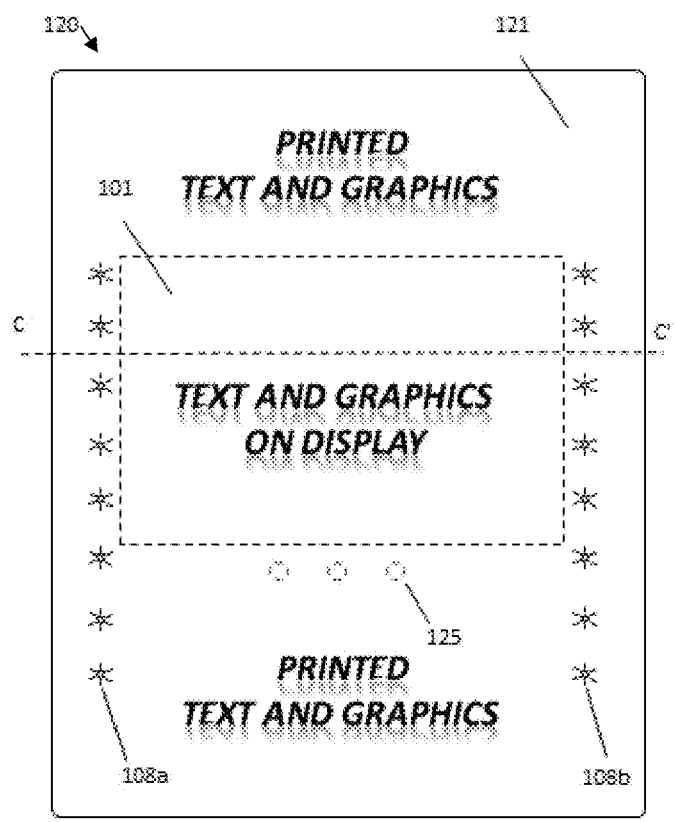
FIG. 3a illustrates a schematic top view of an interactive terminal according to an aspect of the disclosed embodiments.
Figure 3B:
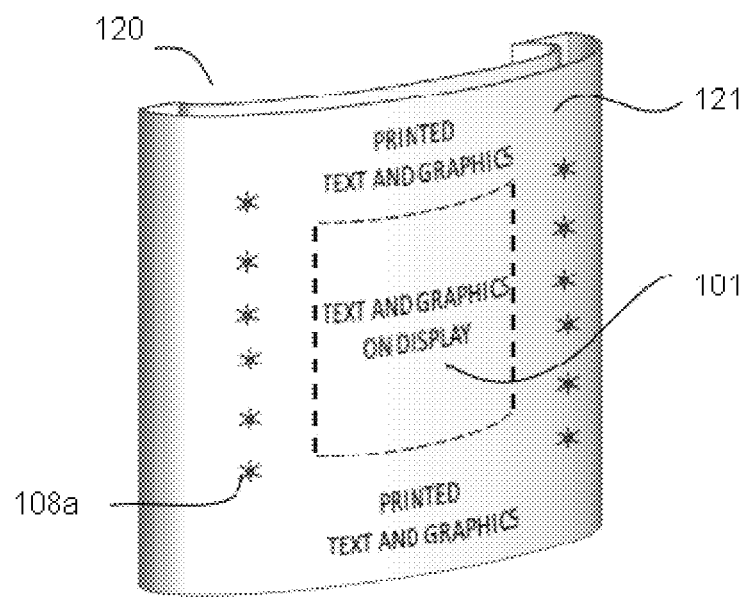
FIG. 3b illustrates a schematic perspective view of an interactive terminal according to another aspect of the disclosed embodiments.
Figure 4A:
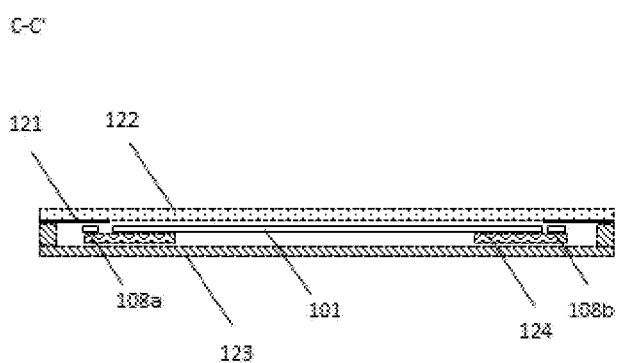
FIG. 4a illustrates a schematic view of a cross-sectional area of the interactive terminal at intersection C-C' according to FIG. 3a, FIG. 4b illustrates a schematic view of a cross-sectional area of the interactive terminal according to FIG. 3b.
Figure 4B:
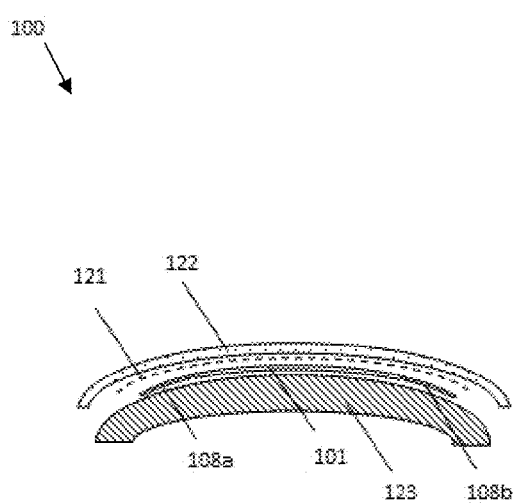

In another embodiment, illustrated in FIG. 3b and FIG. 4b, the interactive terminal 100 employs a curved shape. A key enabling factor for the curved shape is the flexible display 101. Such flexible displays 101, where the backplane is made on flexible substrate, are well known in the art. In addition to the display 101, the other electronics parts of the terminal may employ construction on flexible-PCBs. The parts of the main electronics board 102 may be mounted on a flexible PCB to allow improved adaptation to curved surfaces. Similarly, the LED indicator boards 108a, 108b may also be constructed on flexible PCBs, which can be of particular advantage as the LED indicator boards may be of a significant lateral size.

It is obvious to the person skilled in the art that the curved shape illustrated in FIG. 3b and FIG. 4b is not restricted to be curved around only one axis, but the shape can have two or more curvatures around a multitude of axes. In essence, the interactive terminal 100 can thus be considered as an intelligent conformable surface which can be installed, for example, as an add-on, on a multitude of uneven installation bases. Thus, the device design is not restricted to having constraints such as having to accommodate a rigid large-area display, and many potential existing installation locations, such as towel dispensers or waste containers, that employ a non-flat design may become easily accessible or feasible. Further, a flexible add-on terminal can be utilized on multiple different installation bases without the need to construct a special housing or mechanical fixture for each differing case.

In addition, the flexible components and the flexible displays 101 provide considerable advantages in making the terminals 100 mechanically more robust regarding mishandling. For example, the flexible displays 101 are much more shock and impact proof than their counterparts with rigid glass TFT-backplanes. Thus, mechanical impacts such as the terminal being hit or kicked are much less likely to induce damage to the display 101. From another viewpoint, the protective measures such as the protective front layer 122 can be made less comprehensive. Besides the direct savings in cost, this can aid significantly in achieving a desired terminal look as well as in the optical performance as thinner protective front layers 122 may be employed. Also, for example, the anti-reflectance measures can be easier to be implemented when the protective front layer 122 is thinner.

Figure 5:
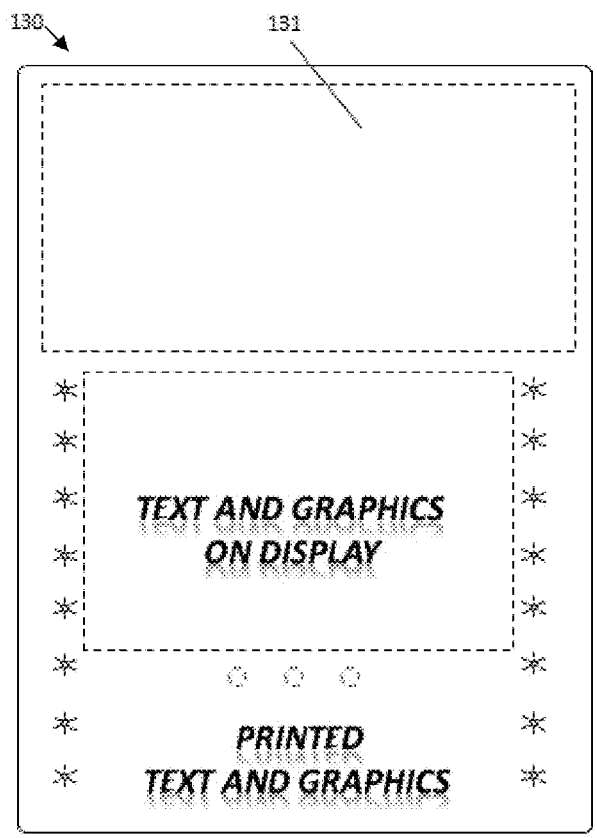
FIG. 5 illustrates a schematic top view of an interactive terminal according to another aspect of the disclosed embodiments.

In another embodiment illustrated in FIG. 5, the interactive terminal 130 includes a photovoltaic (PV) cell 131 for power harvesting. As the terminal average power consumption can be lowered, for example, to a level of only about 10 [mW], a reasonably small area photovoltaic cell 131 may be sufficient to cover the entire power supply. For example, in well-lit indoor conditions in retail environment (500 lx), a flexible PV cell made of amorphous silicon with lateral area of approximately 30 [cm]×30 [cm] can produce the desired 10 [mW] power. Such PV area can well be accommodated on the terminal front, especially in a poster or billboard-type installation. In outdoor applications, the sun light intensity levels are typically significantly higher, e.g. up to 1000 times higher vs. the indoor artificial light conditions. This makes powering feasible at even significantly smaller PV cell area in outdoor conditions.

Figure 6:
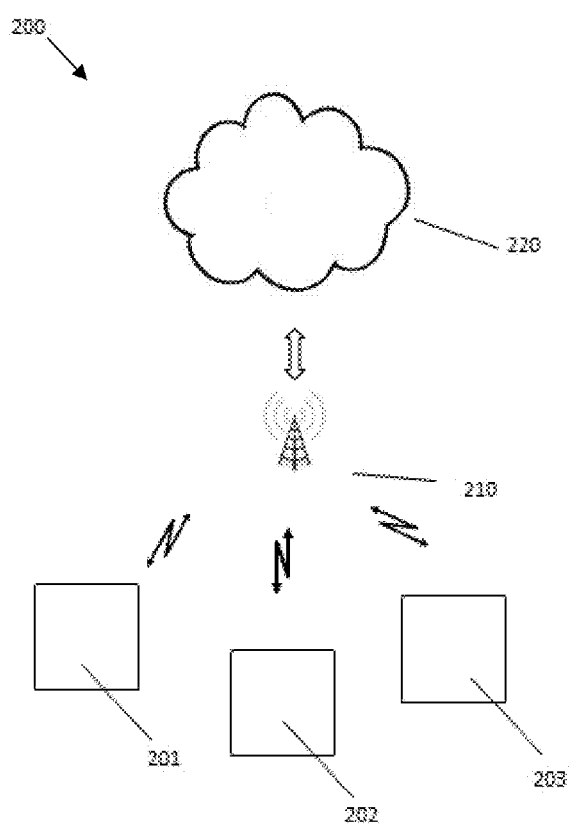
FIG. 6 illustrates a schematic view of an advertising system comprising i=1, 2, . . . , n interactive terminals.

The disclosed embodiments include a method for digital distribution of digital display content with an integer number h of content pages c=1, 2, . . . , h such as advertising material to be displayed at an integer number m of j=1, 2, . . . , m defined locations. An advertising system 200 according to the disclosed embodiments is illustrated in FIG. 6. An integer number n of interactive terminals i=1, 2, . . . , n, for example, three interactive terminals 201, 202, 203, i.e. i=j=n=m=3, may be connected to a wireless or cellular communication network 210. Interactive terminal 201 may, for example, comprise a number of c=h=7 content pages and interactive terminals 202, 203 may comprise a number of c=h=3 content pages. The wireless or cellular connection is utilized as a gateway to the system services, comprising, for example, servers and control software, illustrated by the cloud 220. The connection 210 enables a bi-directional data transmission with two main functionalities. The usage data is collected from the terminals to the system database (upstream) and content updates are delivered from the servers to the terminals (downstream). The overall advertising campaign progress can be thus be monitored and controlled on-line via the system portal. If need arises, the campaign can be dynamically changed. For example, based on the measured usage and sales information, additional offers or new content can be provided to further boost the campaign or the geographic campaign focus in the terminal network can be changed.

As the usage at each terminal may be measured in detail, e.g. how many hand swipes have occurred or how many discount codes have been downloaded, the invoicing can be based on quantified usage, rather than conventional anticipated or estimated usage. For example, an advertising campaign can be charged based on true recorded interactions. Different charging categories can be applied: simple ad browsing can be charged at a reasonably low rate while each coupon download traced to actual product purchase can be charged at a higher rate.

The advertising system 200 further enables efficient means for collecting consumer feedback or performing "Smart Polls". As an example of a Smart Poll, the central system transmits a question-of-the-day that is displayed on each interactive terminal i=1, 2, . . . , n. The question can be based on a generally interesting hot topic or it can be commercially related, e.g. product satisfaction or product awareness. The users answer the question simply by a gesture, for example a hand-swipe left (no) or right (yes). The answer counts are collected from each interactive terminal i=1, 2, . . . , n to the central system, summed and transmitted downstream to each interactive terminal at regular intervals. Thus, as a simplest reward, the user can get the information of the overall poll status. Alternative rewards include, for example, product discount codes. A key advantage of the system is that the electronic display enables showing of poll status in graphical mode. This can be utilized, for example, in displaying the geographic variation in answers.

Tests of the disclosed embodiments have shown that the overall sleep mode power consumption can be reduced below a level of a few milliwatts. The power consumption of the various active modes, e.g. display update, LED pattern or cellular connection, obviously depend on how frequently they are applied. As an example, an analysis shows that one LED pattern where 16 LEDs are each driven by 100 [mW] power for 25 [ms] twice per minute leads to $P_{ave}$~3 [mW] average power consumption. The related microcontroller active state power consumption is herein included. The analysis also shows that the touchless gesture triggered display update using a 9.7-inch E-ink panel done once per minute leads to $P_{ave}$~5 [mW]. The analysis further shows that a cellular data exchange connection done once per hour leads to about $P_{ave}$~2 [mW]. In summary, the entire average power consumption for this example is thus at a level of $P_{ave}$~12 [mW], when assuming 2 [mW] for the sleep state power. Using a Li-polymer rechargeable battery with 20 [Wh] capacity, commonly applied in tablet computers, the battery lifetime of our terminal could be about 70 [days]. In a more frequent usage scenario of, e.g., a Smart Poll terminal being interacted four times per minute on average, the battery lifetime may still exceed two weeks.

Such a long battery lifetime is a critical advantage. The interactive terminals can be truly cordlessly installed with ease and the service interval is sufficiently long to keep the maintenance-induced cost and inconvenience at a competitive level. The re-charging can be done in many ways, for example the entire terminal can be replaced with a re-charged one, i.e. the drained unit will be taken to the maintenance center and relocated after re-charging. Another possibility is to replace the battery pack only. A third possibility is to charge the terminal at the installation location or nearby, for example, during off-hours.

In one scenario, the terminals may be reloaded for a new advertisement campaign at a service center. The printed graphics may be replaced, the digital content may be uploaded, and the battery may be re-charged, along with general cleaning and inspection. After the service, the terminals may be deployed in the field for the campaign duration, e.g. two weeks. When the campaign is over, the terminals may be collected back, reloaded and re-deployed. As the service time is short in comparison with the campaign duration, e.g. one day vs. 14 days, the duty cycle remains high.

Another advantage of the disclosed embodiments is reduced energy consumption. The power-consumption of a state-of-the-art interactive LCD-terminal is significantly, at least an order of magnitude, larger than that of the presently disclosed embodiments. For example, a state-of-the-art 32-inch LCD-display consumes about 50 [W] which results in about 400 [kWh] annual consumption. The annual electricity cost is significant especially regarding such LCD display purchasing cost and is consequently reflected in the reduced profit margin of such display installations.

Figure 7:
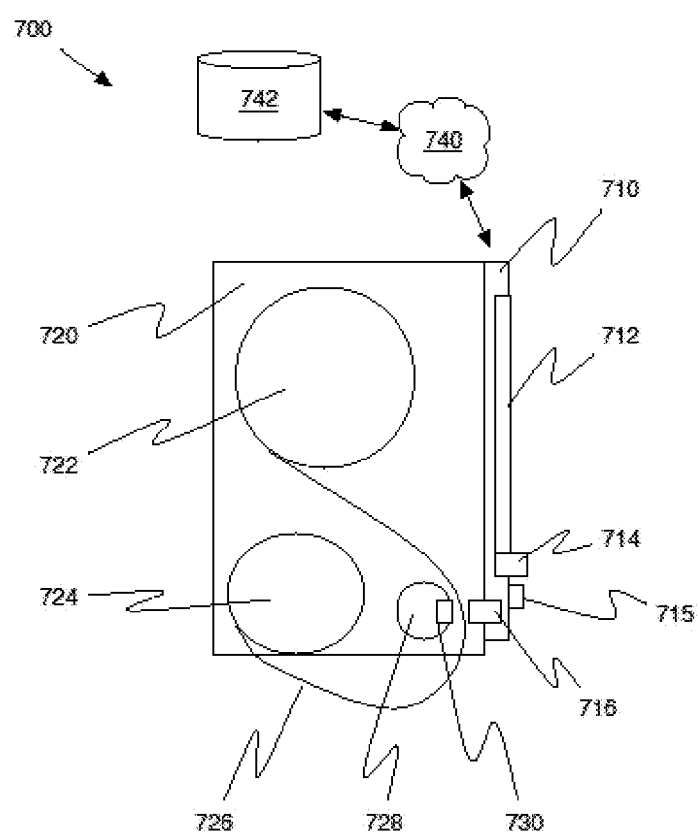
FIG. 7 illustrates a schematic view of a towel dispenser according to embodiments of the present disclosure.
Figure 8:
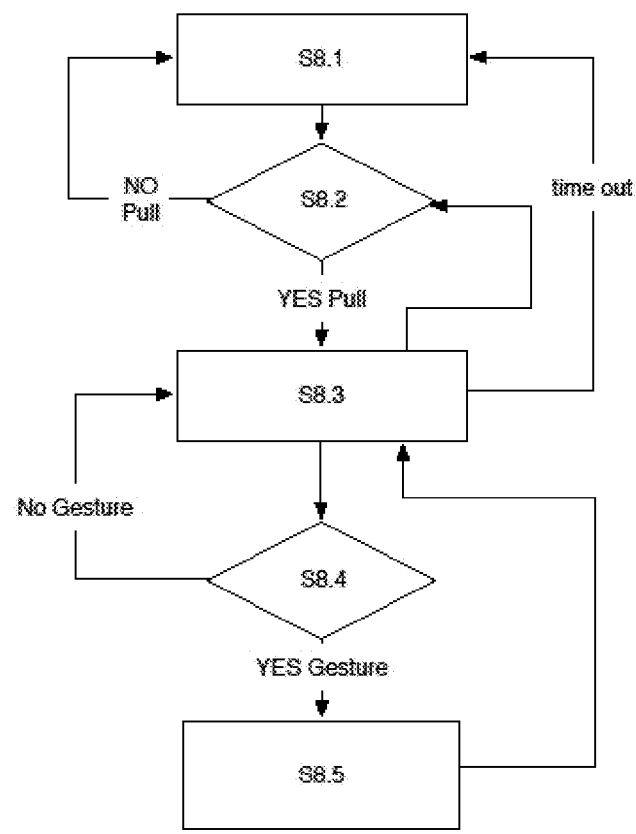
FIG. 8 illustrates a method according to the embodiments disclosed herein.

FIG. 7 and FIG. 8 are used to present an example according to embodiments of the present disclosure.

In FIG. 7 a system 700 according to other aspects of the present disclosure is illustrated. An exemplary towel dispenser 720 is used to dispense towel 726. An unused part of the towel 726 is stored in upper roll 722. As the user pulls the towel 726, it is dispensed from the upper roll 722. The towel 726 moves rotating gear 728 while it is pulled. A permanent magnet 730 is connected to the rotating gear 728. The permanent magnet 730 moves with the gear 728 as the towel 726 is pulled. The used part of the towel is collected by lower roll 724. A terminal 710 is connected to front face of the towel dispenser 720. The terminal 710 may be interactive and may include a bi-stable display 712 for displaying content for the user. The content can be delivered to the terminal 710 via a communication network 740, such as the Internet from a service running in server system 742. The content can be delivered to the terminal 710 in real time or before the content is used (i.e. caching, for example, two or more figures/pictures to be shown in the display 712). A sensor, for example, a Hall-sensor, reed switch or other suitable sensing device 716 detects movement of the magnet 730. As the movement is detected the terminal 710 is configured to alter/change information content in the display 712. Additionally LED(s) 715 can be turned on or flashed to attract the users attention. The movement detection can also be used to turn on a proximity detector 714 (such as an IR detector). A user in the front of the terminal 710 can change information content in the display 712 by performing one or more pre determined gestures in the proximity of the detector 714. Additionally, LED(s) 715 can be flashed as the user performs a gesture to indicate a successful gesture. This is beneficial since some of the bi-stable displays have a slow response time. It might take 1-2 seconds to refresh the display. By flashing the lights the user knows that the gesture will have an impact on the information content to be displayed in the display 712. In one or more embodiments, the proximity detector 714 can be utilized independently of the magnetic sensor 716. The proximity sensor can be turned OFF after a time out if desired.

FIG. 8 an exemplary schematic flow chart according to one or more aspects of the present disclosure. In this example, the terminal 710 may be attached to a towel dispenser 720 of FIG. 7. In step S8.1 the terminal 710 is in a first mode. In the first mode the bi-stable display shows default content or a last displayed portion of content. The proximity sensor 714 is turned OFF. In step S8.2 a signal from magnetic sensor 716 is analyzed. If there is no movement detected the process goes back to step S8.1. If movement is detected the process goes to step S8.3 and the terminal 710 is configured to be in a second mode. In step S8.3 proximity sensor 714 is turned ON. Additionally information content in the display 712 can be changed and other audio or visual content such as flashing LED's 715 can be presented. In step S8.4 a signal from proximity detector 714 is analyzed. If there is no gesture detected the process goes back to step S8.3. If no gestures are detected after a predetermined time out the process goes further back to step S8.1 and returns to the first mode. If there is a gesture such as movement of a hand from left to right, new content is shown in the display 712 (step S8.5). The process goes back to step S8.3 to continue in the second mode. The process can be configured to detect further gestures or further pulls of the towel when in the second mode.

Although the disclosed embodiments have been described in detail for the purpose of illustration, various changes and modifications can be made within the scope of the claims. In addition, it is to be understood that the present disclosure contemplates that, to the extent possible, one or more features of any embodiment may be combined with one or more features of any other embodiment.

It should be understood that the embodiments disclosed herein are not limited to digital distribution of advertisement material. Digital display content may comprise any graphical and/or textual elements.

LIST OF REFERENCE NUMBERS

100 interactive terminal
101 electronic digital display
102 main electronics board
103a microcontroller or microprocessor
103b non-volatile memory
104 display electronics
105 cellular module
106 antennas
107 user interface
108a LED indicator board
108b LED indicator board
110 audio electronics
111 audio module
112 housing
113 opening or transparent window
115 graphical code
116 user's mobile device
120 interactive terminal
121 printed graphics
122 protective front layer
123 terminal frame
124 mechanical means
125 openings
130 interactive terminal
131 photovoltaic cell
200 advertising system
201 interactive terminal
202 interactive terminal
203 interactive terminal
210 wireless or cellular communication network
220 cloud or server
c content page
i interactive terminal
j location

The invention claimed is:

1. A system for distribution of digital content, having at least one interactive terminal with a display, the system comprising:
    at least one battery,
    an electronics board including at least one microprocessor, at least one memory for storing digital content, and electronics for enabling digital image creation on the display by the at least one microprocessor, wherein the system further includes:
    a wireless or cellular communication module,
    at least one antenna coupled to the communication module for communication with at least one server infrastructure, and
    means for controlling a touchless user interface configured to provide interactive user input to said system in order to display selected content on said interactive terminal and to provide a code to be captured by a user's mobile device for tracking effectiveness of advertising displayed on the interactive terminal.

2. The system according to claim 1, wherein the display of the interactive terminal is an electrophoretic active matrix panel, or any other bi-stable or multi-stable display.

3. The system according to claim 1, comprising the touchless user interface, wherein the touchless user interface is configured for detection of electromagnetic waves.

4. The system according to claim 3, wherein the touchless user interface comprises a reflectance IR-based touchless user interface, where light is emitted by means of one or more IR LED, wherein the emitted light is reflected by user interaction and reflected light is measured using at least one IR sensor.

5. The system according to claim 3, wherein the touchless user interface comprises a capacitive user interface.

6. The system according to claim 3, wherein the touchless user interface comprises a rf-radar touchless user interface.

7. The system according to claim 1, wherein the interactive terminal comprises means adapted to be connected to and triggered by another device, system or apparatus.

8. The system according to claim 1, comprising at least one LED indicator board arranged beside the display of the interactive terminal which emits visible light signals visible from outside of the interactive terminal.

9. The system according to claim 1, comprising audio electronics having an output transducer or an input transducer in an audio module.

10. The system according to claim 1, comprising at least one photovoltaic cell for power harvesting.

11. The system according to claim 1, wherein the interactive terminal comprises a protective front layer.

12. The system according to claim 3, wherein the interactive terminal comprises at least one layer of printed graphics having an opening for the dicplayordisplay or openings for the touchless user interface.

13. The system according to claim 1, wherein the interactive terminal comprises at least one layer of printed graphics arranged beside the display.

14. The system according to claim 1, wherein the interactive terminal comprises at least one layer of replaceable printed graphics.

15. The system according to claim 8, wherein the interactive terminal comprises at least one layer of printed graphics and at least one LED of the at least one LED indicator board is visible through the at least one layer of printed graphics or through at least one transparent opening of the at least one layer of printed graphics.

16. The system according to claim 1, comprising mechanical means for attaching the interactive terminal to a wall, another device, system or an apparatus.

17. The system according to claim 1, comprising mechanical means for attaching the interactive terminal to a towel dispenser.

18. A method for digital distribution of digital content with content pages $c=1, 2, \ldots, h$ to be displayed with at least one interactive terminal at at least one location $j=1, 2, \ldots, m$, wherein the method includes:

locating at least one $i=1, 2, \ldots, n$ interactive terminal at a defined location $j=1, 2, \ldots, m$ for displaying said digital content;

providing means for interaction with a user via a touchless user interface to receive a user input and to provide a code to be captured by a user's mobile device for tracking effectiveness of advertising displayed on the interactive terminal;

based on said user input, communicating over a wireless or cellular communications network and at least one server infrastructure adapted to interact with said communications network, in order to display selected content on said at least one interactive terminal.

19. The method according to claim 18, comprising:

displaying a first page of the content pages $c=1, 2, \ldots, h$, on the display of at least one $i=1, 2, \ldots, n$ interactive terminal, detecting a gesture by the at least one $i=1, 2, \ldots, n$ interactive terminal, and displaying a second page of the content pages $c=1, 2, \ldots, h$ on the display of at least one $i=1, 2, \ldots, n$ interactive terminal after detection of the gesture.

20. The method according to claim 18, comprising:

connecting the at least one $i=1, 2, \ldots, n$ interactive terminal to another device which is adapted to interact with said terminal in order to display on said terminal a first page of the content pages $c=1, 2, \ldots, h$, detecting at said at least one $i=1, 2, \ldots, n$ interactive terminal an external trigger signal from said other device, to cause said at least one $i=1, 2, \ldots, n$ interactive terminal to display a second page of the content pages $c=1, 2, \ldots, h$.

21. The method according to claim 20, wherein said external trigger signal is generated by one or more of:

putting a coin into the other device, system or apparatus, selecting a product such as chewing gums or a chocolate bar in the other device, system or apparatus, operating a towel dispenser, flushing a toilet in a restroom, and using a water-tap in a restroom.

\* \* \* \* \*